Patented July 28, 1942

2,291,284

UNITED STATES PATENT OFFICE 2,291,284

COATING COMPOSITION

John H. Lowell, South River, N. J., assignor to E. I. du Pont de Nemours & Company, Wilmington, Del., a corporation of Delaware No Drawing. Application November 28, 1939, Serial No. 306,497

4 Claims. (Cl. 106—191)

This invention relates to improved nitrocellulose lacquer compositions and more particularly to lacquer compositions suitable for spray application.

The prior art shows clearly a continuing struggle for higher solids at spraying viscosities. Many of the suggestions made failed completely. A limited number has been adopted commercially and has been hailed as being revolutionary in their effects. Of these, Reissue Patent 16,803, disclosing the use of low viscosity nitrocellulose, is the most important in that a great majority of the cellulose nitrate compositions sold today are based upon it. Continued development work on quality improvement and new modifying agents, particularly on synthetic resins, gradually permitted the art to use cellulose nitrate of lower and lower viscosity characteristics. New compatible polyhydric alcohol-polybasic acid resins were discovered and these in many instances could be used in larger amounts. Literally hundreds of non-volatile liquid organic plasticizers were developed and tested in attempts to further increase the solids at spraying viscosity. In short, many means of increasing the solids and lowering the cost of the lacquer compositions has been resorted to.

The present invention is concerned with reducing the economic differential described above to favor the continued utilization of cellulose nitrate coating compositions through important improvements in the compositions, without detracting from the inherently superior quality which characterizes this type of composition.

This invention has as its primary object the provision of coating compositions whereby substantial economy in material and operating costs is secured. Another object is the provision of coating compositions having higher solids at coating compositions spraying viscosity than has heretofore been possible. Another object is the provision of coating compositions which when sprayed at normal spraying viscosity give coating thicknesses considerably beyond normal expectations. A further object is the provision of coating compositions which can be satisfactorily sprayed at viscosities greater than has thus far been possible. A still further object is the provision of coating compositions which can be sprayed readily without sacrifice in desirable qualities demanded by the user, such as maximum durability and toughness.

These objects are accomplished through the use in cellulose nitrate lacquers and enamels of extremely powerful, balanced solvent combinations for cellulose nitrate as hereinafter disclosed.

By solvent combinations, I mean all the volatile ingredients present in the lacquer at the instant of spraying, including the active solvents for cellulose nitrate, and also non-solvent diluents such as alcohols and the aliphatic and aromatic hydrocarbons (e. g., toluol and gasoline). Some of these active solvents are acetone, methyl ethyl ketone, methyl propyl ketone, methyl isobutyl ketone, methyl acetate, ethyl acetate, the normal, iso and secondary butyl acetates, the isomeric amyl acetates, cyclohexyl acetate, ethyl propionate, ethyl butyrate, ethyl caproate, methyl formamide, ethyl ether of ethylene glycol, ethyl ether of diethylene glycol, the acetate of ethyl ether of ethylene glycol, propylene oxide, isobutylene oxide and many others. Certain combinations of non-solvents show solvent power as, for example, ethyl ether-ethyl alcohol. These solvents differ markedly in volatility as well as in their solvent power for nitrocellulose.

Solvent power has been measured by a number of methods, each of which ties in with the usage to which the measurement is to be put. In this disclosure I prefer to evaluate solvent power as the viscosity of a solution of a definite quantity of dry nitrocellulose by weight in an equally definite quantity of solvent or solvent combination when measured at a temperature of 25° C. in any form of a calibrated viscosimeter, whereby it is possible to express the values in standard viscosity units (centipoises).

The amount of cellulose nitrate present in a spray lacquer is limited by the maximum viscosity at which the lacquer can be applied without difficulty by spraying. The optimum viscosity ranges of the present art for satisfactory spraying have been found to be in a very narrow range, dependent upon the type of spray equipment used. The optimum viscosity range for the spraying of clear furniture lacquers has been found to be 50 to 85 centipoises, while for pigmented automotive enamels the viscosity range is 20 to 50 centipoises. These ranges are limitative only in that the best practical results are obtained by using them with lacquers of the present art.

I have discovered that improved high solids cellulose nitrate spraying lacquers result when I greatly reduce or even practically eliminate from my solvent combination low boiling, non-solvent diluents such as benzol, toluol and the gasoline type substitutes for benzol and toluol, as well as excessive portions of ethyl alcohol, and for these substitute highly active low boiling solvents such as acetone, methyl ethyl ketone, methyl acetate or ethyl acetate, without necessarily altering the proportions and balance of the less volatile active solvents, alcohols and diluent hydrocarbons normally present in commercial spraying lacquers.

I further limit myself to total solvent combinations having a solvent power for lacquer type nitrocellulose, as measured by viscosity, of not less than about 80% that of absolute ethyl acetate for the same sample of nitrocellulose, that is, the viscosity of the solution should not be more than 1¼ times that of an ethyl acetate of the same concentration. In order to conveniently determine whether any solvent or solvent combination fulfills this requirement, a 15% solution of a nitrocellulose of about 12.0% nitrogen content and a viscosity characteristic of about ½" Hercules should be prepared and the viscosity measured by any conventional means. Table 2 includes results of this test applied to several commercial solvents.

I have found that the new compositions possess the unexpected quality of ease of spraying at viscosities above those now considered optimum for commercial work. I have also discovered that the compositions have better flowing or smoothing-out characteristics at the end of the spraying operation. The lacquers also function in an unexpected fashion in giving increased coating thicknesses all out of proportion to the increase in lacquer solids at the spray gun.

My discovery accomplishes seven chief benefits—

(1) Lower viscosity at any definite solids than the prior art.

(2) High solids at present practical spraying viscosity.

(3) A higher permissible spraying viscosity.

(4) Unexpected increase in coating thickness at a given solids concentration.

(5) Improved overall spraying characteristics with less surface roughness.

(6) It requires no unusual equipment for manufacture or application.

(7) It requires no new or difficultly obtainable ingredients.

It is a well-recognized principle that very volatile solvents such as acetone or ethyl acetate cannot be satisfactorily sprayed, unless accompanied by less volatile solvents because of excessive losses during spraying. Also, a considerable temperature reduction occurs during the spraying which causes too great a condensation of moisture from the air on the sprayed lacquer coat and this moisture will become entrapped in the drying film unless solvents less volatile than water are present. It is, therefore, to be understood that by a balanced solvent combination I mean either a single solvent or a combination of solvents which can be sprayed without excessive loss and which also have the power of eliminating precipitated moisture before the sprayed film sets up to a gel state.

The term "high solids" as used herein refers to my findings that when using the improved type of solvent compositions described, I obtain a higher concentration of solids at spraying viscosity than has been obtained with previous solvent compositions considered satisfactory for spraying.

It is well known that commercial compositions must deposit films that are as free as possible from excessive spray dust and blushing. The new compositions are entirely satisfactory in these respects.

It is a known fact that under a given set of conditions, each volatile ingredient has a specific temperature depression effect when sprayed and also that a definite percentage will be dissipated into the air. The combined depressions and losses measure to a great extent the behavior of a solvent combination during spraying.

In order to illustrate this point, an experiment has been carried out with a DeVilbiss spray gun (type CH, tip #92), during which a variety of solvents has been sprayed individually and the temperature depressions determined. The air pressure at the gun when spraying was 50 pounds, and the air temperature at a distance of 10 inches from the tip of the gun was 23° C. At this point the relative humidity of the air was 18%.

Table 1

| Solvent used | Vapor pressures @ 25° C. | Temperature depression |
|---|---|---|
| | Mm. | °C |
| Ethyl alcohol (95% by volume) | 57.5 | 19.0 |
| Isobutyl alcohol | 14.0 | 8.9 |
| n-Butyl alcohol | 7.3 | 6.5 |
| Isoamyl alcohol | | 5.6 |
| Ethyl acetate (99%) | 90.0 | 25.5 |
| Isobutyl acetate (90%) | 17.0 | 12.3 |
| n-Butyl acetate (90%) | 13.5 | 9.2 |
| Isoamyl acetate (85%) | | 6.3 |
| Acetone | 220.0 | 35.0 |
| Methyl ethyl ketone | 93.0 | 24.0 |
| Methyl n-butyl ketone | 14.0 | 9.7 |
| Toluol | 29.0 | 14.9 |
| Xylol | 6.7 | 7.2 |
| High solvency petroleum naphtha (95-135° C.) | | 15.0 |
| High solvency petroleum naphtha (140-190° C.) | | 5.2 |
| Water | 23.5 | 11.2 |

The term "low boiling" solvents or diluents is a phraseology generally accepted by the art. However, its meaning has not been sufficiently specific to define its limits. Therefore, "low boiling" as it is used in this disclosure refers to organic liquids which on spraying show a temperature depression characteristic equal to or greater than toluol. Expressed in terms of the data collected, this means that any volatile organic liquid having a temperature depression of at least about 15° C., when water sprayed under the same conditions shows a temperature depression of 11.2° C. and toluol of 14.9° C. is a "low boiling" material.

In my process I control the proportions of volatile ingredients in such a manner that the evaporation losses during spraying produce results not found in prior art volatile components. The fact that some loss in solvent power occurs during spraying, coupled with the reduction in the ratio of solvent to solids as the material hits the surface, means that the viscosity is very much greater than at the spray gun. Added to this is the further viscosity increase due to the cooling effect or temperature depression as the volatile solvents are sprayed. A still further viscosity increase is caused by the water condensed during the spraying of the volatile solvents.

Thus, the actual viscosity of the coating material as it hits the surface being coated is the sum of the original viscosity plus that due to loss of solvent power, plus that due to actual loss of solvent, plus that due to the lower temperature, plus that due to the presence of precipitated moisture. Thus, it can readily be proven that the viscosity has increased several-fold in the extremely short passage of the lacquer from the gun to the object being coated. I have found that it is this increase in viscosity which allows the application of abnormally thick coatings with solvent compositions in this disclosure.

It is common practice at present to use as great a proportion of highly volatile ingredients as possible and still obtain satisfactory smoothing-out of the coatings. I have found that the use of highly volatile non-solvent diluents in considerable amounts, as has been the practice, sharply limits the quantity of more powerful solvents that can be used, and also that such a practice limits the solids content in the lacquers as sprayed. I have discovered that by reducing the low boiling diluents such as toluene, gasoline, and ethyl alcohol very greatly and directly substituting for them low boiling active solvents such as ethyl acetate or methyl ethyl ketone as well as smaller amounts of acetone, I obtain solvent combinations new to the spray art.

The viscosity of nitrocellulose in absolute ethyl acetate is much lower than the viscosities secured with the great majority of active nitrocellulose solvents. So, in order to secure solvent combinations which will have a solvent power at least 80% that of absolute ethyl acetate, I blend active cellulose nitrate solvents of high volatility and high solvent power with active solvents of low volatility and attendant lower solvent power along with non-solvent diluents to give an average solvent power in my specified range and with spraying characteristics more than comparable with the present art.

It is well known that substantial viscosity reduction can be produced through the use of small quantities of the lower aliphatic alcohols such as ethyl, propyl, butyl and amyl alcohol in combination with the active solvents. I prefer to make the best possible use of small amounts of these alcohols to give the minimum viscosity characteristics but always only after practical spraying tests show that the other desirable qualities are not lost thereby.

Benzol, toluol, xylol and gasoline are the hydrocarbon diluents most commonly disclosed in the prior art. Benzol is objectionable because of toxicity and toluol now ranks as the most important aromatic hydrocarbon used. I can and do make use of relatively smaller amounts of toluol when it is necessary to secure a perfect compatibility relationship between the nitrocellulose and the resin modifiers, either natural or synthetic. Aliphatic hydrocarbons of the gasoline type either before or after cracking or hydrogenation, are now widely used by the art principally due to the low cost. I prefer to use the special lacquer type gasoline thinners which contain appreciable percentages of unsaturated branched chain hydrocarbons as they are more nearly equivalent to the efficiency of toluol than are the straight chain gasolines.

Certain resins such as damar show incompatibility in the presence of high alcohol concentrations and one skilled in the art will avoid non-commercial compositions by a proper balancing of the diluents and alcohols. Thus, it will be seen that certain modifying ingredients prevent the use of hydrocarbon-free lacquers.

In general, I prefer to employ solvent combinations containing low concentrations of non-solvent hydrocarbon diluents having evaporation rates greater than that of water and in most cases the proportion of this type of material should not exceed 15% by weight of the total solvent combination. I also prefer to include active cellulose nitrate solvents in predominant proportions, in general, not less than about 1½ times the amount of non-solvent diluents.

It has been explained that in general high solvent power and high volatility go together. This is particularly true in any homologous series of organic solvents. As a class the ketones are better solvents than the esters at the same range of volatility, and of the esters the acetates are more powerful solvents than the esters of the higher fatty acids such as propionic and butyric. The following table is given in order to illustrate the difference in the solvent power expressed in viscosity units of several of the solvents described, and also to show the fact that as the volatility in any class of compounds decreases, the solvent power also decreases very considerably. The data also show a surprisingly small number of solvents which alone can be considered to have a solvent power at least 80% that of ethyl acetate.

*Table 2*

| | Viscosity (centipoises) |
|---|---|
| Acetone | 50 |
| Methyl ethyl ketone | 85 |
| Methyl propyl ketone | 109 |
| Methyl acetate | 145 |
| Ethyl acetate | 152 |
| Methyl n-butyl ketone | 215 |
| n-Butyl acetate | 255 |
| Isobutyl acetate | 270 |
| Isoamyl acetate | 400 |
| Methyl ester of ethylene glycol | 460 |
| Ethyl ether of ethylene glycol | 495 |

A clear furniture lacquer was prepared having the following composition:

Example 1

| | Per cent by weight |
|---|---|
| Nitrocellulose (¼ sec. viscosity) | 13.6 |
| Raw castor oil | 2.1 |
| Dibutyl phathalate | 3.6 |
| Maleic acid modified rosin ester | 13.6 |
| Denatured ethyl alcohol | 5.7 |
| Methyl ethyl ketone | 25.9 |
| n-Butyl acetate | 16.5 |
| n-Butyl alcohol | 8.2 |
| High solvency petroleum naphtha 140–190° C.) | 10.8 |
| | 100.0 |

This lacquer was compared with a standard commercial furniture lacquer of known utility having the following composition in which the ratio of the solids ingredients is identical with the high solvency formula but with 26.2% solids content as compared with 32.9% for the high solvency type:

Example 2

| | Per cent by weight |
|---|---|
| Nitrocellulose (¼ sec. viscosity) | 10.9 |
| Raw castor oil | 1.6 |
| Dibutyl phthalate | 2.9 |
| Maleic acid modified rosin ester | 10.9 |
| Denatured ethyl alcohol | 8.5 |
| Absolute ethyl acetate | 6.0 |
| n-Butyl acetate | 22.0 |
| n-Butyl alcohol | 3.5 |
| Toluol | 33.7 |
| | 100.0 |

The viscosity of the high solvency lacquer of Example 1 at optimum spray performance was found to be 100 centipoises as compared with 60 centipoises for the standard furniture lacquer of Example 2 after tests had been made to show that the high solvency formula could be sprayed at the higher viscosity with better results. Additional viscosity tests show that in the case of the high solvency type, a solids concentration of 29% was secured at a viscosity of 60 centipoises. Thus, we show that at the same viscosity, at the gun, the use of the more powerful solvent combination allowed an increase of 11% in solids, but that due to the better spraying characteristics, it was possible to use a viscosity high enough to actually spray satisfactorily with a lacquer containing 24% increase in solids over that of the standard prior art furniture lacquer. A spraying test on Example 1 was carried out in a room at 25° C. and at a relative humidity below 30%. Example 1 was sprayed at a viscosity of 100 centipoises at 25° C. through a distance of 10 inches and collected for examination. The solids were found to be 40.0% as compared with 32.5% at the start. The temperature had dropped to 14° C. or a drop of 11° C. and the water content had jumped from 0.84% to 1.50%. The viscosity of the collected material at 14° C. was very close to 1000 centipoises.

The sagging tendencies of thick wet coats of lacquer on a vertical surface are highly dependent upon the viscosity of the lacquer as it hits the object. The higher the viscosity of the lacquer, the thicker the allowable coating. The securing of the major portion of solvent power through the use of high concentrations of very volatile active solvents permits me to obtain an abnormal rise in viscosity because of the markedly greater loss in solvent power during spraying brought about through high losses of these highly volatile active solvents.

The spray tests gave unexpected results in resultant thickness of film when the new compositions were applied to a wood surface. It was found that the standard prior art furniture lacquer (Example 2) could be sprayed onto a vertical surface at a dry film thickness of 1.2 mils in a single coat. Any substantially thicker film gave sagging or running of the lacquer film during the drying of the panel. The high solvency lacquer (Example 1) when sprayed onto a vertical surface in one coat gave a dry film thickness of 2.2 mils, and in some instances it was possible to obtain a film thickness of 2.5 mils before air bubbles appeared in the film. It was also determined that a dry film thickness of 2.8 mils could be obtained from the high solvency lacquer before definite sagging tendencies became noticeable. Thus, with an increase of 24% of solids at the gun, the new solvent formula permits the application of a film at least 83% thicker than that secured with the prior art film. This great increase in film thickness was entirely unexpected and gave rise to greatly stimulated research in the study of spraying compositions. An explanation as has been discussed above is that due to the high percentage of the highly volatile methyl ethyl ketone in the high solvency formula, which solvent tends to disappear rapidly during spraying, a much greater increase in viscosity occurs during the spraying operation, so that the wet coat of lacquer on the wood has a much higher viscosity than is the case with the prior art material.

Utilization of the temperature depression data given in Table 1 can be made in a further analysis of the differences between the solvent combinations of Example 1 and Example 2. It has been found that the total temperature depression of a combination of solvents can be closely approximated by multiplying the temperature depression characteristic of the individual solvent by the weight percentage of that material present in the combination. The sum of these individual depressions is, with very few exceptions, substantially equal to the temperature depression obtained through the actual spraying of the combination. Therefore, the analysis of new solvent combinations is made possible provided that a representative set of data on the temperature depressions of any group of volatile organic liquids has been obtained. As has been pointed out, the conditions prevailing during the spraying of solvents make major differences in the actual numerical temperature depression data obtained, but when all materials under test are evaluated under carefully controlled conditions, the results secured are extremely useful and directly comparable. In the analysis of this particular problem, the data given in table 1 will be considered to be fully representative of the temperature depressions obtained under one set of spraying conditions.

Thus, the volatile ingredients in Example 1 give a calculated total temperature depression of 14.8° C., of which total temperature depression the methyl ethyl ketone contributes 62% while the hydrocarbon diluents contribute only 5.6%. Compare this with Example 2 where the temperature depression is found to be 13.6° C. and where the low boiling active solvent represented in this case by ethyl acetate contributes only 15% of the total temperature depression, whereas 47% is caused by the hydrocarbon diluents present. One of the most important points of this analysis is that the total temperature depressions of useful spraying mixtures lie in a very narrow range which, when utilizing the data in Table 1, can be expressed as 13.5–15.5° C. Thus, we can show that even though we are utilizing, in the case of Example 1, a solvent mixture containing 38.6% methyl ethyl ketone by weight, this abnormally high concentration of low boiling active solvent does not cause excessive temperature depression and its resultant high blushing tendencies. Also, if the temperature depression is more than 16° C., excessive precipitation of water from the atmosphere will occur during spraying under humid conditions leading to the typical and widely prevalent phenomenon of blushing. On the other hand, if the temperature depression is less than 13° C., the mixture will be markedly slower drying and the sprayed coating will, in general, have an excessive sagging tendency when applied in thick coats to a vertical surface.

In many cases it has been found advantageous to use considerable amounts of high boiling hydrocarbon diluent as the presence of these in the sprayed, wet film tends to greatly increase the viscosity and overcomes sagging to a marked degree. It is important, however, that less than about 25% of the total temperature depression is due to the presence of hydrocarbon diluents.

EXAMPLE 3.—*Black enamel*

| | Per cent by weight |
|---|---|
| Nitrocellulose (¼ sec. viscosity) | 10.3 |
| Damar resin | 2.5 |
| Synthetic resin | 2.5 |
| Dibutyl phthalate | 2.4 |
| Blown castor oil | 1.3 |
| Carbon black | 1.7 |
| Denatured ethyl alcohol | 4.4 |
| Methyl ethyl ketone | 25.4 |
| Isobutyl acetate | 22.3 |
| Isoamyl acetate | 5.2 |
| Isobutyl alcohol | 3.7 |
| Isoamyl alcohol | 6.0 |
| High solvency petroleum naphtha (140–190° C.) | 7.0 |
| High solvency petroleum naphtha (95–135° C.) | 5.3 |
| | 100.0 |

This enamel which incorporates the principles of my invention was compared with a standard black automotive enamel having the identical solids ratio, but at a solids content of 13.9% as compared with 20.7% possible with the improved solvent combination.

The conventional enamel had the following formula:

EXAMPLE 4

|  | Per cent by weight |
|---|---|
| Nitrocellulose (¼ sec. viscosity) | 6.9 |
| Damar resin | 1.7 |
| Synthetic resin | 1.7 |
| Dibutyl phthalate | 1.6 |
| Blown castor oil | 0.9 |
| Carbon black | 1.1 |
| Denatured ethyl alcohol | 8.7 |
| Isopropyl acetone | 2.2 |
| Methyl ethyl ketone | 7.3 |
| Isobutyl acetate | 17.5 |
| Isoamyl acetate | 6.8 |
| Isobutyl alcohol | 3.1 |
| Isoamyl alcohol | 2.7 |
| High solvency petroleum naphtha (140–190° C.) | 5.3 |
| High solvency petroleum naphtha (95–135° C.) | 32.5 |
|  | 100.0 |

The synthetic resin used in these compositions consisted of a reaction product of

|  | Per cent by weight |
|---|---|
| Glycerine | 16.2 |
| Phthalic anhydride | 36.6 |
| Cottonseed oil | 47.2 |
|  | 100.0 | the reaction having been carried out according to methods already well known to the art.

The enamels are prepared in steps, the first of which represents the dispersion of the carbon black in a heavy duty kneading machine in a colloid consisting of a portion of the nitrocellulose, dibutyl phthalate and solvents whereby a very stiff paste is formed and continuing the kneading action until the dispersion had reached a predetermined point. Dispersion can be secured by other procedures such as rolls grinding or pebble mill grinding provided suitable proportions of the available ingredients are used to give the optimum dispersion effects.

The remaining nitrocellulose is then converted into a solution by using a portion of the remaining solvent combination. The pigmented intermediate, nitrocellulose base, resins, plasticizers and solvents are then mixed together by means of an efficient paddle type mixer until homogeneous.

In commercial practice, it is customary to prepare a concentrated enamel for shipment to the user and to provide a thinner free from solid material to allow the user to thin as desired. For the purposes of this disclosure and to simplify the disclosure, the composition of the thinned material is being used to illustrate the products of the invention, it having been my experience that unless this is done, it is impossible for any except those skilled in the art to understand the principles involved.

The viscosity of the improved enamel of Example 3 at the point of optimum spraying characteristics was 43 centipoises as compared with the conventional enamel of Example 4 at 20 centipoises, showing again as in Example 1 that my invention permits spraying at a substantially higher viscosity than the present art.

Comprehensive spraying tests were then carried out on large sheets of automotive steel, on fenders and on auto bodies on a commercial production line. In all cases it was found possible to obtain in three coats a lacquer thickness with the improved formula equivalent to six coats with the conventional formula.

Thus, with an increase in total solids of only 50%, and this increase in solids possible only through the improved spraying characteristics, it has been found that an increase of 100% in film thickness per coat is readily secured without loss in quality of the applied coat. In fact, improvements in flowing out, greater resistance to atmospheric conditions and less rubbing and polishing occurred when using the improved composition. The results were substantially all out of proportion to those predictable in the light of past experience.

Analyzing Examples 3 and 4 by means of the temperature depression data given in Table 1, we find that the total temperature depression of the volatile ingredients in Example 3 is 14.9° C., of which methyl ethyl ketone contributes almost exactly 51% and the hydrocarbon diluents contribute only 7%. The total temperature depression of Example 4 is 14.36° C., of which the low boiling active solvents, specifically acetone and methyl ethyl ketone, contribute only 20% of the total temperature depression, whereas the hydrocarbon diluents contribute 41%, or a major portion. Here again, as in Examples 1 and 2, we are able to show by a simple calculation, how it is possible to use unexpected concentrations of low boiling active solvents without markedly changing the blushing characteristics of the finished lacquers.

It must be understood that the discussion of the importance of temperature depressions is tied with the blushing characteristics as well as with the real spraying advantages contributed through the use of the large concentrations of low boiling active solvents. However, none of the particular advantages of higher solids at spraying viscosity, higher actual spraying viscosity, and abnormally thicker spray coats, could be obtained commercially if abnormal increases in temperature depression were brought about by these formulations. Therefore, I do not substantially depart from the temperature depression range of from 13.5 to 15.5° C.

These examples show instances in which from 51% to 62% of the total temperature depression is due to the presence of low boiling active nitrocellulose solvents having a temperature depression greater than 15° C. However, I am not limited to these high values and have obtained improved, useful compositions within the range of 40 to 80% of total temperature depression due to the presence of these low boiling, highly volatile and highly active solvents, although I prefer compositions in which from 45 to 65% of the total temperature depression is caused by these active solvents.

Many other compositions falling within the scope of my disclosure have since been studied, and in every instance it has been found possible to make important savings in the costs of application, and in all cases it has been possible to apply thicker coats.

Substantially my invention as disclosed results in the production of nitrocellulose lacquers and enamels having a higher solids content at spraying viscosity than prior art enamels. In addition, a further increase in solids at the spray gun has been secured because of the higher viscosity at which the lacquers can be sprayed. When sprayed the solvents in the enamels show less of a temperature depression per unit of solids applied, thus lessening the amount of moisture precipitated from the air during the spraying operation and lessening the tendency to blush or haze. Due to the higher ratio of solids to solvent at all stages and also due to the loss of a very substantial proportion of the very active but very volatile nitrocellulose solvents during the spraying operation, the viscosity of the sprayed material as it hits the work is very high, so that abnormally thick coatings can be applied before any trace of sagging or running is encountered.

It is to be understood that this invention relates to nitrocellulose coating compositions suitable for spraying, and in this invention derivatives of cellulose such as cellulose acetate, or other esters, or ethers of cellulose are not equivalents.

I can make use of almost every ingredient developed for and found useful in the lacquer art, thereby permitting the formulation of products of maximum durability and utility at a substantially lower consumption of volatile solvents and more particularly products costing less to apply, thus effecting major economies for the user.

Also, I may prepare these products in any conventional manner, making use of standard equipment and manufacturing procedures.

Inasmuch as the process of spraying is substantially different from brushing, dipping, roller coating, knife coating, casting and flow coating, the efficiency of my invention is specific almost entirely to the spray art. In general, while it is possible to use this disclosure to prepare materials readily applied by these other procedures, the abnormal differences in coating thickness will not be found beyond the fact that the preferred solvent combination will give high solids concentrations at any specified viscosity.

It is apparent that many widely different embodiments of the invention may be made without departing from the spirit and scope thereof; and, therefore, it is not intended to be limited except as indicated in the appended claims.

I claim:

1. A sprayable, blush-resistant, high solids coating composition comprising cellulose nitrate and a volatile liquid organic vehicle which has a solvent power for cellulose nitrate of at least about 80% that of absolute ethyl acetate as measured by the viscosity of equal percentage solutions, and which has a calculated temperature depression characteristic during spraying of between 13.5° and 15.5° C. when water sprayed under the same conditions gives a depression of about 11.2° C., of which temperature depression 40 to 80% is contributed by the partial evaporation of cellulose nitrate solvents having a temperature depression greater than that of toluol.

2. A sprayable, blush-resistant, high solids coating composition comprising celulose nitrate and a volatile liquid organic vehicle which has a solvent power for cellulose nitrate of at least about 80% that of absolute ethyl acetate as measured by the viscosity of equal percentage solutions, and which has a calculated temperature depression characteristic during spraying of between 13.5° and 15.5° C. when water sprayed under the same conditions gives a depression of about 11.2° C., of which temperature depression 45 to 65% is contributed by the partial evaporation of cellulose nitrate solvents having a temperature depression greater than that of toluol.

3. A sprayable, blush-resistant, high solids coating composition comprising cellulose nitrate and a volatile liquid organic vehicle which has a solvent power for cellulose nitrate of at least about 80% that of absolute ethyl acetate as measured by the viscosity of equal percentage solutions and which has a calculated temperature depression characteristic during spraying of between 13.5° and 15.5° C. when water sprayed under the same conditions gives a depression of about 11.2° C., of which temperature depression 40 to 80% is contributed by the partial evaporation of cellulose nitrate solvents having a temperature depression greater than that of toluol and less than 25% is contributed by hydrocarbon diluents.

4. A sprayable, blush-resistant, high solids coating composition comprising cellulose nitrate and a volatile liquid organic vehicle which has a solvent power for cellulose nitrate of at least about 80% that of absolute ethyl acetate as measured by the viscosity of equal percentage solutions, and which has a calculated temperature depression characteristic during spraying of between 13.5° and 15.5° C. when water sprayed under the same conditions gives a depression of about 11.2° C., of which temperature depression 45 to 65% is contributed by the partial evaporation of cellulose nitrate solvents having a temperature depression greater than that of toluol and less than 25% is contributed by hydrocarbon diluents.

JOHN H. LOWELL.